2 Sheets—Sheet 1.
E. E. LEACH.
HORSE HAY RAKE.
No. 178,862.    Patented June 20, 1876.
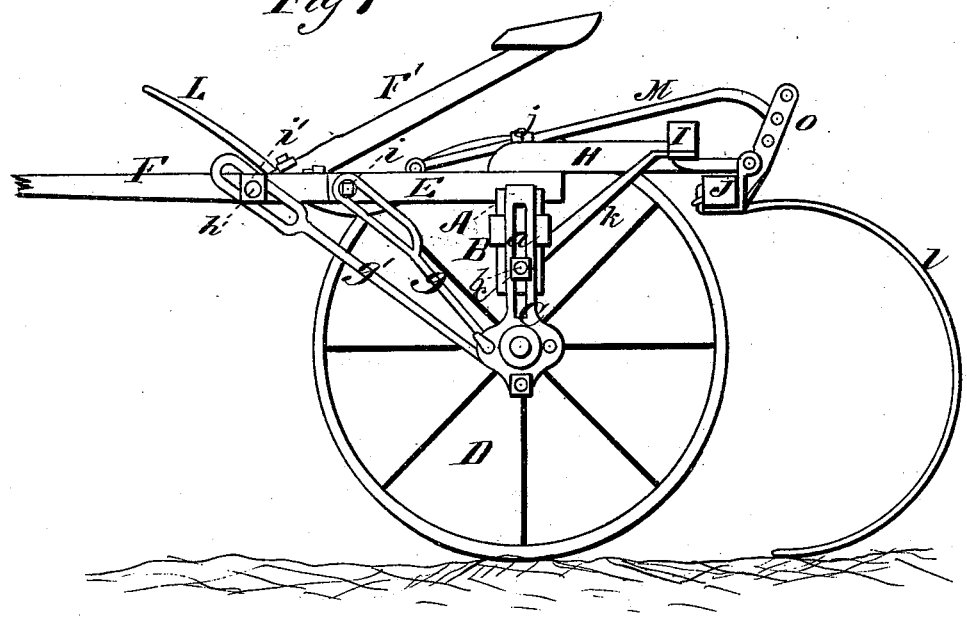
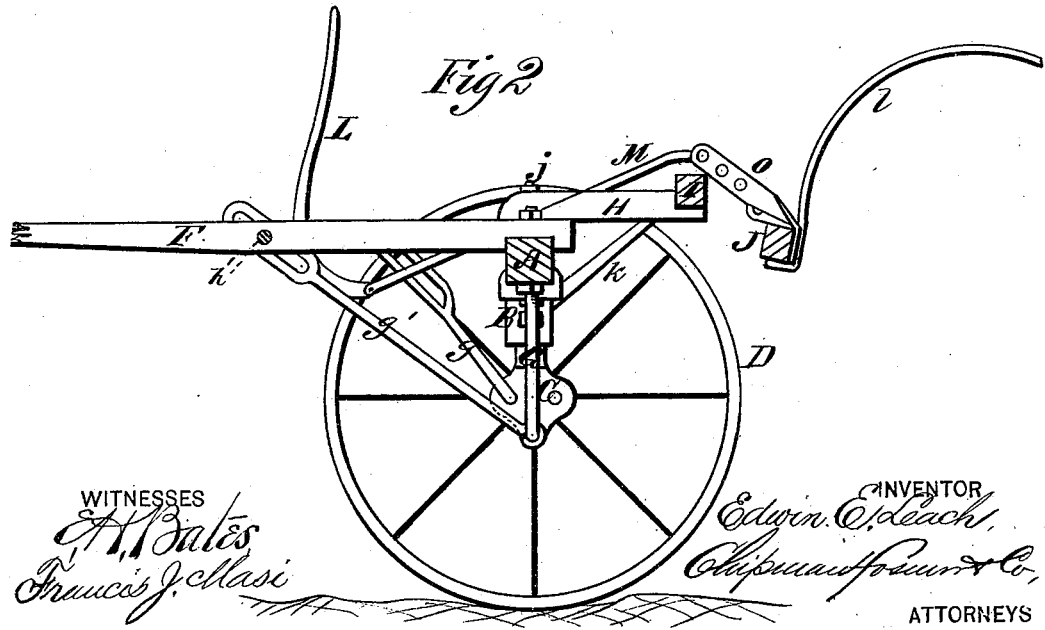
WITNESSES
INVENTOR
Edwin E. Leach,
ATTORNEYS 2 Sheets—Sheet 2.

E. E. LEACH.
HORSE HAY RAKE.

No. 178,862. Patented June 20, 1876.

WITNESSES
INVENTOR
Edwin E. Leach
ATTORNEYS

UNITED STATES PATENT OFFICE.

EDWIN E. LEACH, OF CEDAR RAPIDS, IOWA.

IMPROVEMENT IN HORSE HAY-RAKES.

Specification forming part of Letters Patent No. 178,862, dated June 20, 1876; application filed April 3, 1875.

*To all whom it may concern:*

Be it known that I, EDWIN E. LEACH, of Cedar Rapids, in the county of Linn and State of Iowa, have invented a new and useful Improvement in Horse Hay-Rakes, which is fully described in the following specification, reference being had to the accompanying drawings, in which—

Figure 3:
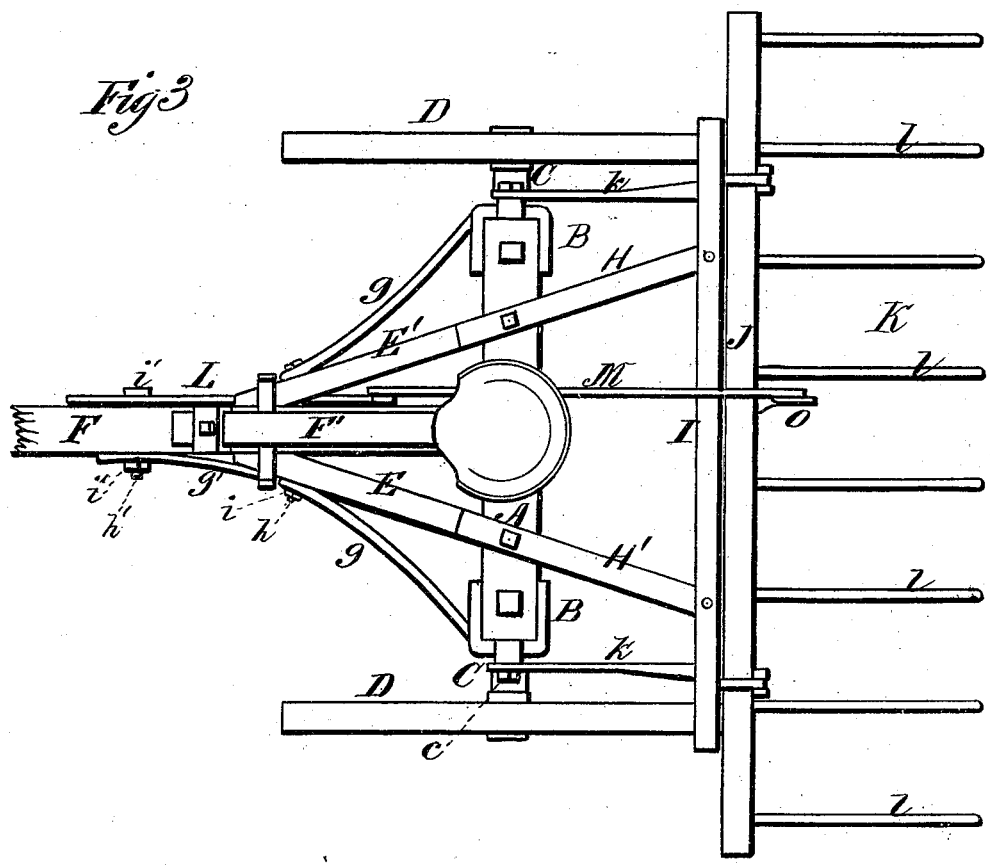
Figure 4:
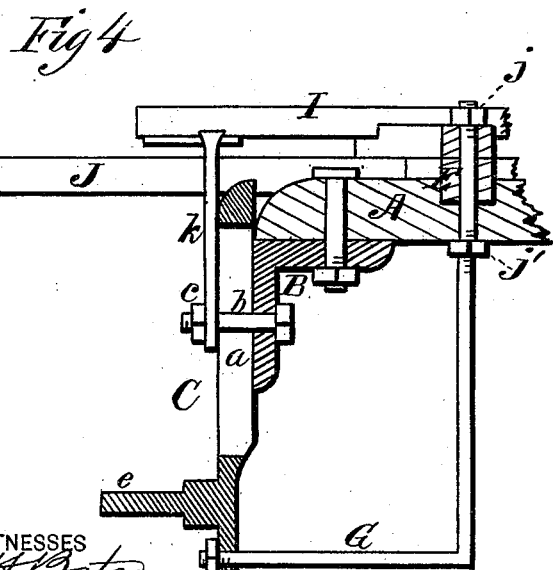

Figure 1 represents a side elevation of the rake; Fig. 2, a longitudinal vertical section of the same; Fig. 3, a plan view of the same; and Fig. 4, a sectional detailed view on an enlarged scale.

The object of my invention is to adapt the rake of a carrying-frame, which may be used also for other purposes.

The invention consists in attaching the rake to the carrying-frame by means of devices which are readily detached, so as to disconnect the raking appartus from the frame; and, also, in making the mechanism by which the rake is actuated, detachable, so that the entire raking apparatus may be readily removed, and the carrying-frame left wholly free for the attachment of other devices.

In the drawings, A represents a strong supporting cross-bar, to each end of which is bolted an angle-iron, B. The outside of these irons is provided with a deep rectangular groove, within which is arranged an adjustable and detachable spindle - plate, C. The spindle-plates C are provided with stub-axles $e$, upon which are placed the supporting-wheels D. The pole F is rigidly attached to the cross-bar A, and braced in the usual manner by the hounds E E', which are also attached to the cross-bar A. A seat-standard, F', is rigidly secured to the pole, and upon it is mounted a seat for the accommodation of the driver. The plates C are held securely in position by means of suitable adjustable brace-rods $g$ $g'$, which are hooked into the plates, and which are secured, respectively, to the hounds and tongue by bolts $h$ and nuts $i$.

This structure, as described above, constitutes a supporting and carrying frame, to which the raking apparatus is attached. I do not, however, here claim any novelty in the construction of this frame, and it is adapted for use not only with a hay-raking apparatus, but also various other devices used upon a farm.

Strong supporting-arms H H' are attached to the rear ends of the hounds E E' by means of bolts G, which pass through the bar A, hounds E, and arms H, and are held in position by nuts $j$ upon the screw-threaded ends of the bolts. A cross-bar, I, is attached to the rear ends of the supporting-pieces H H', and is braced by means of rods $k$, which are rigidly secured to the bar, and extending forward are also secured to the plate C by means of the clamping-bolt $b$ and nut $c$ upon its threaded end. The head J of a rake, K, of any suitable construction, is hinged to the cross-bar I. An arm, O, is attached to the rake-head, to which is pivoted the rear end of a connecting-rod, M, the forward end of which is pivoted to the lower end of a lever, L. The lever L is pivoted near its lower end to the pole, and extends upward so as to be readily reached by the driver in his seat. The moving of the lever L back and forth tilts the rake whenever it is desired to discharge its load or to pass an obstacle, and the construction and relative arrangement of the lever, connecting-rod, and arm O are such that when the lever is thrown forward to its greatest distance, the rake will be locked in working position. The lever L is attached to the pole by means of a bolt and nut, so that it can be readily disconnected therefrom whenever desired. As the supporting-arms H H' and the braces $k$ $k$ are also attached to the supporting-frame by means of screw-threaded bolts and nuts, it is evident that the entire raking apparatus, including the actuating mechanism, may be readily detached, and removed bodily from the supporting frame or carriage, which may then be used for the attachment of corn-plows or cultivators, harrows, a seeding-machine, or any other agricultural implement adapted to this frame.

It may be desirable in some instances to leave the lever L upon the machine for the purpose of raising and lowering the apparatus which replaces the rake. When this is desired the connecting-rod M is disconnected from the lever, and the latter is left attached to the pole; or, if it is desired to use the rod M also, it is disengaged at its rear end from the arm O, and the rake only is removed.

By this construction of the raking mechanism, adapting it to be readily attached to and detached from its supporting-frame, I am enabled to use a carriage for the rake which may also be used with several other attachments, so that with only a single carriage the former may be provided with a number of agricultural machines.

Having thus described my invention, what I claim, and desire to secure by Letters Patent, is—

1. The combination of a wheel-frame unincumbered by other working mechanism and a hay-raking apparatus, detachably connected to said frame, so that it may be removed bodily therefrom, and leave the frame entirely free for the attachment of other devices, substantially as described.

2. The combination of the carriage-frame, detachable arms H H', detachable braces k, and a rake, K, substantially as described.

3. The combination of a raking apparatus, connected to the carrying-frame by detachable arms and braces, and the lever L, also detachable from the frame, substantially as and for the purpose set forth.

In testimony that I claim the above I have hereunto subscribed my name in the presence of two witnesses.

EDWIN E. LEACH.

Witnesses:
  B. K. ADAMS,
  WM. W. GREENE.